United States Patent Office 2,888,408
Patented May 26, 1959

2,888,408

TREATMENT OF FLEXIBLE CELLULAR POLYURETHANE MATERIAL WITH AMMONIA

Thomas H. Rogers, Jr., Akron, and Newell R. Bender, Cuyahoga Falls, Ohio, assignors to The Goodyear Tire & Rubber Company, Akron, Ohio, a corporation of Ohio No Drawing. Application March 21, 1955
Serial No. 495,809

1 Claim. (Cl. 260—2.5)

This invention relates to the preparation of flexible cellular materials. More particularly, it relates to methods for treating flexible, elastomeric, cellular structures formed from liquid reaction mixtures containing polyisocyanates and to improved products obtained by the use of these methods.

The production of flexible, cellular structures from liquid polymeric reaction mixtures containing polyisocyanates is a relatively recent development. The reaction mixtures from which the cellular structures are made contain polymeric materials which are either liquid at room temperature or capable of being melted at relatively low temperatures. The polymeric materials contain active hydrogen atoms which react with the isocyanate groups to form a network of cross-linked molecular chains. The polyisocyanate not only functions as a cross-linker or curative for the polymeric material but also reacts with water provided in the liquid reaction mixture to generate carbon dioxide which causes the liquid reaction mixture to expand and foam, with resultant formation of a flexible, cellular structure which retains its foamed cellular character after the polymer has been cross-linked.

It has been observed that in the production of flexible, cellular structures from this type of reaction mixture the foamed, cured material occasionally appears to be undercured, in that, under compression, the deformed article fails to snap back to its original dimensions after the compressive force has been removed. It is believed that this observed phenomenon is due to the adhesive character of the inner surfaces of the individual cells. The reason for this apparent under-cure or the adhesive character of the cells is not fully understood.

It is an object of this invention to provide a method for treating the foamed structures in a manner to improve the resilience. It is a further object to improve the snap of the cellular structures. It is still another object to eliminate the tendency of the cured, cellular structure to resist the return from a deformed condition to its original condition after compressive forces have been removed. Another object is to provide a treatment for the cellular structures which is adaptable to processing the structures in a substantially continuous manner. Other objects will appear as the description proceeds.

The above objects are accomplished by exposing the flexible, cellular material to the action of ammonia, either in the form of ammonia vapor or liquid ammonium hydroxide.

The practice of this invention is generally applicable to the treatment of flexible, cellular structures from reaction mixtures which contain an active-hydrogen-containing polymeric material, a polyisocyanate and water. By the term "active-hydrogen" is meant those hydrogen atoms which are reactive as measured and determined by the Zerewitinoff method.

Examples of the active-hydrogen-containing polymeric materials are polyesters, polyesteramides, polyalkylene ether glycols, and mixtures of two or more of these. The polyesters and polyesteramides are preferably formed from bifunctional materials, such as dibasic carboxylic acids, amino carboxylic acids, glycols, amino alcohols and diamines. Small amounts of trifunctional materials may optionally be employed in preparing the active-hydrogen-containing polymeric materials. Polyesters and polyesteramides having an average molecular weight of approximately 1000 to 5000, an acid number not greater than 5, and a hydroxyl number from 20 to 110, are preferred.

Any dibasic carboxylic acid, preferably those whose carboxyl groups are attached to terminal carbons, may be used to form the polyester or polyesteramide, including succinic, glutaric, adipic, pimelic, suberic, azelaic, sebacic, malonic, brassylic tartaric, maleic, malic, fumaric, dilinoleic, thiobutyric, diphenic, isophthalic, terephthalic, hexahydroterephthalic, p-phenylene diacetic, dihydromuconic, and beta-methyladipic acids.

Any glycol may be used in the formation of the polyester including ethylene, propylene 1,2; propylene 1,3; diethylene, triethylene, butylene, pentamethylene, hexamethylene, decamethylene, dodecamethylene, and N,N-diethanolaniline, glycerine mono ethers, and thiodiglycol.

Any amino alcohol having at least one hydrogen atom attached to the amino nitrogen atom may be employed including ethanolamine, 3 amino-propanol, 4 amino-butanol, 6 amino-hexanol, and 10 amino-decanol.

Examples of the diamines which may be used are ethylene, propylene 1,2, tetramethylene 1,4, hexamethylene 1,6, decamethylene 1,10, piperazine, isopropyl amino propyl amine, and 3,3' diamino dipropyl ether. Listed below are the reactants which are used to form particular polyesters and polyesteramides:

(1) Ethylene glycol plus adipic acid.
(2) Propylene glycol 1,2 plus adipic acid.
(3) Ethylene glycol (80 mol percent) propylene glycol 1,2 (20 mol percent) plus adipic acid.
(4) Ethylene glycol (80 percent) propylene glycol 1,2 (20 mol percent) plus azelaic acid.
(5) Ethylene glycol (80 mol percent), propylene glycol 1,2 (20 mol percent) plus sebacic acid.
(6) Ethylene glycol (80 mol percent), propylene glycol 1,2 (20 mol percent) plus dilinoleic acid (20 mol percent), adipic acid (80 mol percent).
(7) Ethylene glycol (80 mol percent), glycerine monoethyl ether (20 mol percent) plus adipic acid.
(8) Ethylene glycol (80 mol percent), butylene glycol 1,4 (20 mol percent) plus adipic acid.
(9) Ethylene glycol (80 mol percent), propylene glycol 1,3 (20 mol percent) plus adipic acid.
(10) Ethylene glycol (80 mol percent), pentane diol 1,5 (20 mol percent) plus adipic acid.
(11) Ethylene glycol (80 mol percent) glycerine monoisopropyl ether (20 mol percent) plus adipic acid.
(12) Ethylene glycol (80 mol percent), propylene glycol 1,2 (from 18 to 5 mol percent), ethanol amine (from 2 to 15 mol percent) plus adipic acid.
(13) Ethylene glycol (80 mol percent), propylene glycol 1,2 (20 mol percent) plus maleic acid (from 3 to 6 mol percent), adipic acid (from 97 to 94 mol percent).
(14) Ethylene glycol (80 mol percent) propylene glycol 1,2 (from 19 to 17 mol percent), piperazine (from 1 to 3 mol percent) plus adipic acid.
(15) Ethylene glycol (80 mol percent), propylene glycol 1,3 (from 18 to 5 mol percent), dihydroxyethyl aniline (from 2 to 15 mol percent) plus adipic acid.
(16) Ethylene glycol (80 mol percent), butylene glycol 1,4 (20 mol percent) plus adipic acid.
(17) Ethylene glycol (80 mol percent), diethylene glycol (20 mol percent) plus adipic acid.
(18) Ethylene glycol (from 90 to 10 mol percent) propylene glycol 1,2 (from 10 to 90 mol percent) plus adipic acid.

(19) Ethylene glycol (from 90 to 10 mol percent), propylene glycol 1,2 (from 10 to 90 mol percent) plus azelaic acid.

Any organic polyisocyanate or mixtures of polyisocyanates may be employed. The amount of polyisocyanate should be at least sufficient to cross-link the active-hydrogen-containing polymeric material and to react with the water present to form carbon dioxide gas. In general, it is preferred to use from 2 to 8 equivalents of isocyanate per mol of polymeric material. Representative examples of polyisocyanates which may be employed are the diisocyanates, such as hexamethylene diisocyanate, para-phenylene diisocyanate, meta-phenylene diisocyanate, 4,4'-diphenylene diisocyanate, 1,5-naphthalene diisocyanate, 4,4'-diphenylene methane diisocyanate, the tolylene diisocyanates, 4,4'-diphenyl ethyl diisocyanate, 3,3'-dimethyl 4,4'-diphenyl diisocyanate, and 3,3'-dimethoxy 4,4'-diphenyl diisocyanate; the triisocyanates such as 4,4', 4"-triphenyl methane triisocyanate, and toluene 2,4,6 triisocyanate; the tetraisocyanates such as 4,4'-dimethyl-diphenyl methane 2,2',5,5' tetraisocyanate and mixtures of polyisocyanates, such as those described in U.S. Patent 2,683,730. Of these, the tolylene diisocyanates and 3,3'-dimethyl 4,4'-diphenyl diisocyanate and 3,3'-dimethoxy 4,4'-diphenyl diisocyanate are particularly preferred.

The water in the reaction mixture is provided to form the carbon dioxide gas for foaming as well as to produce possible points of cross-linking the polymeric material.

Further examples of active-hydrogen-containing polymeric materials and polyisocyanates as well as a discussion of the chemical reactions involved will be found in United States Patents 2,625,531, 2,625,532 and 2,625,535, an article in Rubber Chemistry and Technology for October-December 1950, pages 812–834. The polyalkylene ether glycols are polyethers derived from alkylene oxides or glycols or from other heterocyclic ethers such as dioxolane. These materials may be represented by the formula $HO(RO)_nH$ in which R represents an alkylene radical such as methylene, ethylene or propylene and $n$ is an integer greater than 1. These glycols are either viscous liquids or waxy solids capable of being melted at relatively low temperatures. Further examples of the polyalkylene ether glycols such as the polyethylene ether glycols, the polypropylene ether glycols, and the polybutylene ether glycols and methods for their preparation are described in U.S. Patents 2,692,873 and 2,702,797.

In addition to the three ingredients discussed above, the reaction mixture may optionally contain pigment fillers, reinforcing agents, coloring agents, anti-oxidants, and accelerators.

The practice of this invention is illustrated with reference to the following example in which, unless otherwise indicated, parts are shown by weight:

*Example 1*

A polyester (1200 parts) prepared from adipic acid, 80 mol percent of ethylene glycol and 20 mol percent of propylene glycol and having a hydroxyl number of 62.0, an acid number of 1.7 and an average molecular weight of 1760 was mixed successively with 23 parts of water, 200 parts of diatomaceous earth, 12 parts of a butyraldehyde/butylamine condensation product and 355 parts of tolylene diisocyanate. The butyraldehyde/butylamine condensation product, which functions as a catalyst for the reaction, was prepared from approximately 4 mols of butyraldehyde and 1 mol of butylamine. These condensation products and methods for their preparation are described in "The Journal of American Chemical Society," vol. 70, page 1624, for April 1948. The ingredients were thoroughly mixed, after which they were poured into a cardboard mold. In approximately fifteen minutes the cellular structure formed by the gas evolution was substantially cured. A sample cut from the cured material was tested for resilience and found to be very poor in that respect in that the compressed sample did not readily return to its original dimensions until three to five seconds had elapsed after the compressive force had been removed. Another sample of the foamed material was immersed in a solution of approximately 7% ammonium hydroxide. The sample was then removed from the solution. The excess liquid was squeezed out and the sample was permitted to dry at room temperature. It was observed that the sample treated with ammonium hydroxide had compressive characteristics much superior to the untreated sample in that the treated sample after being compressed returned to its original dimensions in less than one second after the compressive forces were removed.

As an alternative method for obtaining the desired improvement in resilience, the cellular structures can be exposed to an atmosphere containing ammonia vapor.

While certain representative embodiments and details have been shown for the purpose of illustrating the invention, it will be apparent to those skilled in this art that various changes and modifications may be made therein without departing from the spirit or scope of the invention.

We claim:

The process of manufacturing a flexible cellular structure which comprises distributing a liquid reaction mixture containing water, an active-hydrogen-containing polymeric material having an average molecular weight of from 1000 to 5000 and an amount of organic polyisocyanate providing from 2 to 8 equivalents of isocyanate per mol of polymeric material onto a casting surface, permitting the liquid reaction mixture to expand by the generation of carbon dioxide in situ, setting the expanded liquid reaction mixture to form a flexible cellular structure and exposing said flexible cellular structure to an ammonia atmosphere, such exposure being for sufficient time and at such concentration of ammonia as to improve the resilience of said flexible cellular structure, said active-hydrogen-containing polymeric material being selected from the group consisting of polyalkylene ether glycols, polyesters prepared from the condensation reaction between at least one dicarboxylic acid and at least one glycol and polyesteramides prepared from the condensation reaction between at least one dicarboxylic acid, at least one glycol and at least one amino compound selected from the group consisting of amino carboxylic acids, amino alcohols, and diamines, said polyesters and polyesteramides having an acid number not greater than 5.

References Cited in the file of this patent

UNITED STATES PATENTS

| | | |
|---|---|---|
| 2,657,151 | Gensel et al. | Oct. 27, 1953 |
| 2,721,811 | Dacey et al. | Oct. 25, 1955 |